US007695623B2

(12) United States Patent
Woodard et al.

(10) Patent No.: US 7,695,623 B2
(45) Date of Patent: Apr. 13, 2010

(54) SYSTEM AND METHOD FOR ENHANCING AN ACTIVATED SLUDGE PROCESS

(75) Inventors: Steven Woodard, Cumberland, ME (US); Peter G. Marston, Ipswich, MA (US); Ionel Wechsler, Framingham, MA (US)

(73) Assignee: Cambridge Water Technology, Inc., Cambridge, MA (US)

( * ) Notice: Subject to any disclaimer, the term of this patent is extended or adjusted under 35 U.S.C. 154(b) by 42 days.

(21) Appl. No.: 12/008,216

(22) Filed: Jan. 9, 2008

(65) Prior Publication Data

US 2008/0203015 A1 Aug. 28, 2008

Related U.S. Application Data

(60) Provisional application No. 60/879,373, filed on Jan. 9, 2007, provisional application No. 60/994,553, filed on Sep. 20, 2007.

(51) Int. Cl.
*C02F 3/00* (2006.01)
(52) U.S. Cl. .................. 210/620; 210/631; 210/695; 210/723; 210/205; 210/209; 210/220; 210/532.1
(58) Field of Classification Search ......... 210/620–623, 210/631, 695, 723–728, 205, 209, 220, 532.1
See application file for complete search history.

(56) References Cited

U.S. PATENT DOCUMENTS 438,579 A 10/1890 Faunce et al.

(Continued)

FOREIGN PATENT DOCUMENTS

EP 0087223 A1 8/1983

(Continued)

OTHER PUBLICATIONS

Sakai et al., "Magnetic Forced Sedimentation of Flocs in Activated Sludge Supplemented with Ferromagnetic Powder of Iron Oxide," 1991, Journal of Fermentation and Bioengineering, vol. 71, No. 3, pp. 208-210.

(Continued)

*Primary Examiner*—Chester T Barry
(74) *Attorney, Agent, or Firm*—Iandiorio Teska & Coleman (57) ABSTRACT

A system for enhancing an activated sludge process that includes at least one aeration tank subsystem for receiving a flow a wastewater and for introducing dissolved oxygen to a population of microorganisms to promote growth of biological flocs in a mixed liquor defined by a concentration of mixed liquor suspended solids. A weighting agent impregnation subsystem includes an impregnation tank for mixing the mixed liquor, virgin weighting agent, and recycled weighting agent to impregnate the weighting agent into biological flocs suspended in the mixed liquor to form weighted biological flocs. A flocculant injection port located downstream from at least one aeration tank for introducing a flocculant to the mixed liquor for enhancing settling and thickening of the weighted biological flocs and for providing agglomeration of non-impregnated biological flocs and/or partially impregnated biological flocs with weighted biological flocs. At least one clarifier separates and collects the weighted biological flocs from the mixed liquor to provide a secondary effluent and a settled sludge. A return activated sludge subsystem recycles the majority of the settled sludge to the at least one aeration tank. A weighting agent recovery subsystem removes and shears the remaining settled sludge and recovers the weighting agent therefrom and reintroduces the weighting agent to the at least one aeration tank. A wasting subsystem wastes the remaining sludge of the weight agent recovery subsystem to control the population of the microorganisms in the mixed liquor.

41 Claims, 7 Drawing Sheets

U.S. PATENT DOCUMENTS

| | | | |
|---|---|---|---|
| 531,183 A | 12/1894 | Harris | |
| 653,010 A | 7/1900 | Koyl | |
| 2,065,123 A | 12/1936 | Downes | |
| 2,129,267 A | 9/1938 | Fischer | |
| 2,232,294 A | 2/1941 | Urbain et al. | |
| 2,232,296 A | 2/1941 | Urbain et al. | |
| 2,268,461 A | 12/1941 | Nichols | |
| 2,359,748 A | 10/1944 | Clemens | |
| 2,391,494 A | 12/1945 | Walker | |
| 2,401,924 A | 6/1946 | Goetz | |
| 2,652,925 A | 9/1953 | Vermeiren | |
| 2,713,028 A | 7/1955 | Jenks | |
| 2,825,464 A | 3/1958 | Mack | |
| 3,142,638 A | 7/1964 | Blaisdell et al. | |
| 3,228,878 A | 1/1966 | Moody | |
| 3,350,302 A | 10/1967 | Demeter et al. | |
| 3,575,852 A | 4/1971 | Hughes | |
| 3,617,561 A * | 11/1971 | Fanselow | 210/727 |
| 3,676,337 A | 7/1972 | Kolm | |
| 3,697,420 A | 10/1972 | Blaisdell et al. | |
| 3,767,351 A | 10/1973 | Blaser | |
| 3,886,064 A | 5/1975 | Kosonen | |
| 3,951,807 A | 4/1976 | Sanderson | |
| 3,959,133 A | 5/1976 | Fulton | |
| 3,983,033 A | 9/1976 | de Latour | |
| 4,089,779 A | 5/1978 | Neal | |
| 4,110,208 A | 8/1978 | Neal | |
| 4,139,456 A | 2/1979 | Yabuuchi et al. | |
| 4,142,970 A | 3/1979 | Von Hagel et al. | |
| 4,151,090 A | 4/1979 | Brigante | |
| 4,153,559 A | 5/1979 | Sanderson | |
| 4,167,480 A | 9/1979 | Mach | |
| 4,190,539 A | 2/1980 | Besik | |
| 4,193,866 A | 3/1980 | Slusarczuk et al. | |
| 4,274,968 A | 6/1981 | Grutsch et al. | |
| 4,290,898 A | 9/1981 | Von Hagel et al. | |
| 4,320,012 A | 3/1982 | Palm et al. | |
| 4,357,237 A | 11/1982 | Sanderson | |
| 4,377,483 A | 3/1983 | Yamashita et al. | |
| 4,388,195 A | 6/1983 | Von Hagel et al. | |
| 4,402,833 A | 9/1983 | Bennett et al. | |
| 4,465,597 A | 8/1984 | Herman et al. | |
| 4,502,958 A | 3/1985 | Sasaki | |
| 4,579,655 A | 4/1986 | Louboutin et al. | |
| 4,654,139 A | 3/1987 | Baba et al. | |
| 4,689,154 A | 8/1987 | Zimberg | |
| 4,735,725 A | 4/1988 | Reischl et al. | |
| 4,765,900 A * | 8/1988 | Schwoyer et al. | 210/603 |
| 4,765,908 A | 8/1988 | Monick et al. | |
| 4,783,265 A * | 11/1988 | Timmons | 210/666 |
| 4,849,128 A * | 7/1989 | Timmons et al. | 252/181 |
| 4,872,993 A | 10/1989 | Harrison | |
| 4,882,064 A | 11/1989 | Dixon et al. | |
| 4,927,543 A | 5/1990 | Bablon et al. | |
| 4,940,550 A | 7/1990 | Watson | |
| 4,981,593 A | 1/1991 | Priestley et al. | |
| 5,009,791 A | 4/1991 | Lin et al. | |
| 5,023,012 A * | 6/1991 | Buchan et al. | 252/181 |
| 5,064,531 A | 11/1991 | Wang et al. | |
| 5,112,494 A | 5/1992 | Yan | |
| 5,149,438 A | 9/1992 | Hebert | |
| 5,234,603 A * | 8/1993 | Potts | 210/719 |
| 5,266,200 A | 11/1993 | Reid | |
| 5,369,072 A | 11/1994 | Benjamin et al. | |
| 5,395,527 A | 3/1995 | Desjardins | |
| 5,397,476 A | 3/1995 | Bradbury et al. | |
| 5,560,493 A | 10/1996 | Perry | |
| 5,597,479 A | 1/1997 | Johnson | |
| 5,616,250 A | 4/1997 | Johnson et al. | |
| 5,730,864 A | 3/1998 | Delsalle et al. | |
| 5,779,908 A | 7/1998 | Anderson et al. | |
| 5,800,717 A | 9/1998 | Ramsay et al. | |
| 5,840,195 A | 11/1998 | Delsalle et al. | |
| 6,010,631 A | 1/2000 | Delsalle et al. | |
| 6,099,738 A | 8/2000 | Wechsler et al. | |
| 6,210,587 B1 | 4/2001 | Vion | |
| 6,228,269 B1 | 5/2001 | Cort | |
| 6,896,815 B2 | 5/2005 | Cort | |
| 6,960,294 B2 | 11/2005 | Arnaud | |
| 7,153,431 B2 | 12/2006 | Daugherty | |
| 7,255,793 B2 | 8/2007 | Cort | |
| 2007/0039894 A1 | 2/2007 | Cort | |
| 2008/0073267 A1 | 3/2008 | Cort | |
| 2008/0073268 A1 | 3/2008 | Cort | |
| 2008/0073271 A1 | 3/2008 | Cort | |
| 2008/0073278 A1 | 3/2008 | Cort | |
| 2008/0073279 A1 | 3/2008 | Cort | |
| 2008/0073280 A1 | 3/2008 | Cort | |
| 2008/0073281 A1 | 3/2008 | Cort | |
| 2008/0073282 A1 | 3/2008 | Cort | |
| 2008/0073283 A1 | 3/2008 | Cort | |
| 2008/0073284 A1 | 3/2008 | Cort | |
| 2008/0135491 A1 | 6/2008 | Cort | |
| 2008/0164183 A1 | 7/2008 | Marston et al. | |
| 2008/0164184 A1 | 7/2008 | Marston et al. | |
| 2008/0210613 A1 | 9/2008 | Wechsler et al. | |

FOREIGN PATENT DOCUMENTS

| | | |
|---|---|---|
| EP | 0139572 A1 | 5/1985 |
| FR | 1411792 | 8/1964 |
| FR | 2378550 | 1/1978 |
| WO | WO 2008/022192 A2 | 2/2008 |
| WO | WO 2008/039936 A2 | 4/2008 |

OTHER PUBLICATIONS

Sakai et al., "Sewage Treatment under Conditions of Balancing Microbial Growth and Cell Decay with a High Concentration of Activated Sludge Supplemented with Ferromagnetic Powder," 1992, Journal of Fermentation and Bioengineering, vol. 74, No. 6, pp. 413-415.

Sakai et al., "A Sewage Treatment Process Using Highly Condensed Activated Sludge with an Apparatus for Magnetic Separation," 1994, Journal of Fermentation and Bioengineering, vol. 78, No. 1, pp. 120-122.

Sakai et al., "Simultaneous Removal of Organic and Nitrogen Compounds in Intermittently Aerated Activated Sludge Process Using Magnetic Separation," 1997, Technical Note Wat. Res., vol. 31, No. 8, pp. 2113-2116.

Sakai et al., "Recovery and Reuse of Ferromagnetic Powder Supplemented in Activated Sludge for Magnetic Separation," Dept. of Applied Chemistry, Faculty of Engineering, Utsunomiya University, Japan, Submitted: Jun. 28, 1991; Accepted: Oct. 22, 1991, pp. 1-11. Japanese language original (pp. 52-56), and translated English language copy (pp. 1-11).

Kolm et al., High Gradient Magnetic Separation, Scientific American, Nov. 1975, vol. 233, No. 5, 10 pages (unnumbered).

* cited by examiner

SYSTEM AND METHOD FOR ENHANCING AN ACTIVATED SLUDGE PROCESS

RELATED APPLICATIONS

This application claims benefit of and priority to U.S. Provisional Application Ser. No. 60/879,373, filed Jan. 9, 2007, entitled "Process For The Biochemical Treatment Of Wastewater", and also claims benefit of and priority to U.S. Provisional Application Ser. No. 60/994,553, filed Sep. 20, 2007, entitled "A Process For Enhanced Biochemical Treatment Of Wastewater", both incorporated by reference herein.

FIELD OF THE INVENTION

This invention relates to a system and method for enhancing an activated sludge process.

BACKGROUND OF THE INVENTION

Municipal and industrial wastewater treatment facilities often include primary, secondary and tertiary processes to treat wastewater to remove contaminants, such as suspended solids, biodegradable organics, phosphorus, nitrogen, microbiological contaminants, and the like, to provide a clean effluent. The clean effluent is typically subject to strict local, state and federal regulations.

The primary treatment processes often includes screens, grit chambers and/or primary clarifiers to remove large solids and other suspended matter to provide a primary effluent. Activated sludge is one type of secondary process which utilizes an aeration tank(s) which contains a large population of microorganisms that ingest contaminants in the primary effluent to form biological "flocs." Oxygen is typically fed into the aeration tank(s) to promote growth of these biological flocs. The combination of primary effluent, or in some cases raw sewage, and biological flocs is commonly known as mixed liquor. The population or concentration of microorganisms in the mixed liquor is often referred to as mixed liquor suspended solids (MLSS).

After sufficient treatment in the aeration tank(s), the biological flocs in the mixed liquor are then typically sent to a secondary clarifier where the biological flocs are separated by gravity from the mixed liquor to provide a secondary effluent and a settled sludge. The secondary effluent, or "clean" effluent, may be discharged back to the environment or processed by additional tertiary treatment processes. The majority of the settled sludge in the secondary clarifier is typically recycled back to the aeration tank(s) by a return activated sludge subsystem. The remaining, excess sludge is wasted from the system to control the concentration of mixed liquor suspended solids.

However, separation of the biological flocs from the mixed liquor in the secondary clarifier is difficult because the biological flocs are only marginally heavier than water, and therefore settle very slowly. As a result, the secondary clarifier of a typical activated sludge process is the bottleneck in most wastewater treatment processes that utilize activated sludge as a secondary process. The crucial solids separation step of the biological flocs from the mixed liquor in the secondary clarifier is therefore typically the rate limiting process which is governed by a variety of factors, most notably the specific gravity, or density, of the biological flocs.

Moreover, solids separation in the secondary clarifier in a typical activated sludge processes is often unreliable due to the many types of settling problems that are caused by inter alia: overgrowth of filamentous organisms, viscous bulking caused by the overgrowth of either zoogleal organisms or exocellular polysaccharide material, pin floc, straggler floc, excessive solids loading on the secondary clarifiers, excessive secondary clarifier surface overflow rate, and the like.

BRIEF SUMMARY OF THE INVENTION

It is therefore an object of this invention to provide a system and method for enhancing an activated sludge process.

It is a further object of this invention to provide such a system and method which increases the settling rate of biological flocs in a secondary clarifier.

It is a further object of this invention to provide such a system and method which eliminates problems associated with slow settling rates of biological flocs in the secondary clarifier.

It is a further object of this invention to provide such a system and method which increases the capacity of an activated sludge system.

It is a further object of this invention to provide such a system and method which effectively in removes contaminants from a wastewater.

It is a further object of this invention to provide such a system and method which is cost efficient.

It is a further object of this invention to provide such a system and method which is more reliable.

It is a further object of this invention to provide such a system and method which more robust.

It is a further object of this invention to provide such a system and method which enhances removal of contaminants from wastewater.

It is a further object of this invention to provide such a system and method which enhances removal of suspended solids from wastewater.

It is a further object of this invention to provide such a system and method which can increase the MLSS concentration to increase capacity.

It is a further object of this invention to provide such a system and method which can increase the wastewater flow and/or loading to increase capacity.

It is a further object of this invention to provide such a system and method which can increase the MLSS concentration to enhance nitrification of ammonia in the mixed liquor.

It is a further object of this invention to provide such a system and method which enhances removal of nitrogen from wastewater.

It is a further object of this invention to provide such a system and method which enhances removal of phosphorus from wastewater.

It is a further object of this invention to provide such a system and method which reduces the typical footprint of an activated sludge system.

It is a further object of this invention to provide such a system and method which reduces installation costs and land requirements.

It is a further object of this invention to provide such a system and method that enables the utilization of smaller aeration tanks and clarifiers.

It is a further object of this invention to provide such a system and method which may provide a high quality secondary effluent.

It is a further object of this invention to provide such a system and method in which the high quality secondary effluent may meet local, state and federal regulations for wastewater The subject invention, however, in other embodiments, need not achieve all these objectives and the claims hereof should not be limited to structures or methods capable of achieving these objectives.

This invention features a system for enhancing an activated sludge process that includes at least one aeration tank for receiving a flow of wastewater and for introducing dissolved oxygen to a population of microorganisms to promote growth of biological flocs in a mixed liquor defined by a concentration of mixed liquor suspended solids. A weighting agent impregnation subsystem includes an impregnation tank for mixing the mixed liquor, virgin weighting agent, and recycled weighting agent to impregnate the weighting agent into biological flocs suspended in the mixed liquor to form weighted biological flocs. A flocculant injection port located downstream from the aeration tank introduces a flocculant to the mixed liquor for enhancing settling and thickening of the weighted biological flocs and provides agglomeration of non-impregnated biological flocs and/or partially impregnated biological flocs with weighted biological flocs. At least one clarifier separates and collects the weighted biological flocs from the mixed liquor to provide a secondary effluent and a settled sludge. A return activated sludge subsystem recycles the majority of the settled sludge to the aeration tank. A weighting agent recovery subsystem removes and shears the remaining settled sludge and recovers the weighting agent therefrom and reintroduces the weighting agent to the weighting agent impregnation subsystem. A wasting subsystem wastes the remaining settled sludge of the weighting agent recovery subsystem to control the population of the microorganisms in the mixed liquor.

In one embodiment, the mixing tank energy of the mixing may be in the range of about 1.5 HP/1000 ft$^3$ to about 100 HP/1000 ft$^3$. The weighting agent impregnation subsystem may include a storage subsystem for storing the virgin weighting agent and dispensing the virgin weighting agent to the mixing tank. The capacity of the activated sludge system may be increased by increasing the concentration of the mixed liquor suspended solids in the aeration tank by reducing the amount of settled sludge wasted by the wasting subsystem. The amount of the settled sludge wasted by the wasting subsystem may be reduced to increase the concentration of mixed liquor suspended solids for enhancing nitrification of ammonia in the mixed liquor. The nitrification may be enhanced by increasing the amount of dissolved oxygen introduced into the aeration tank. The aeration tank may include at least one anoxic zone configured to remove nitrogen from the mixed liquor. The aeration tank may include at least one anaerobic zone configured to remove of phosphorus from the mixed liquor. A coagulant may be added to the aeration tank, the impregnation tank, or the flocculant injection port to remove phosphorus by precipitation and/or coagulation. The weighting agent may include magnetite. The flocculant may include a cationic and/or anionic polymer. The ratio of the weighting agent to mixed liquor may be greater than about 1:5 to 1. The weighting agent recovery subsystem may include an in-line shear mixer for separating the biological flocs from the weighting agent. The weighting agent recovery subsystem may include a single pass wet drum magnetic separator for recovering the weighting agent from the remaining settled sludge and for introducing the recovered weighting agent into the impregnation tank. The secondary effluent may have a total suspended solids concentration less than about 30 mg/L. The weighting agent impregnation subsystem may dispense the mixed liquor from the aeration tank to the impregnation tank and dispenses the weighted biological flocs back to the aeration tank. The weighting agent impregnation subsystem may be located downstream from the aeration tank and before the secondary clarifier.

This invention also features a system for enhancing an activated sludge process including at least one aeration tank for receiving a flow a wastewater and for introducing dissolved oxygen to a population of microorganisms to promote growth of biological flocs in a mixed liquor defined by a concentration of mixed liquor suspended solids. An impregnation subsystem includes an impregnation tank for mixing the mixed liquor, virgin magnetically separable inorganic material, and recycled magnetically separable inorganic material to impregnate the magnetically separable inorganic material into biological flocs suspended in the mixed liquor to form weighted biological flocs. A flocculant injection port located downstream from the aeration tank introduces a flocculant to the mixed liquor for enhancing settling and thickening of the weighted biological flocs and for providing agglomeration of non-impregnated biological flocs and/or partially impregnated biological flocs with weighted biological flocs. At least one clarifier separates and collects the weighted biological flocs from the mixed liquor to provide a secondary effluent and a settled sludge. A return activated sludge subsystem recycles the majority of the settled sludge to the aeration tank. A recovery subsystem removes and shears the remaining settled sludge and recovers the magnetically separable inorganic material therefrom and reintroduces the magnetically separable inorganic material to the magnetically separable inorganic material impregnation subsystem. A wasting subsystem wastes the remaining sludge of the magnetically separable inorganic material recovery subsystem to control the population of the microorganisms in the mixed liquor.

In one embodiment, the magnetically separable inorganic material includes magnetite.

This invention further features a system for enhancing an activated sludge process that includes at least one aeration tank for receiving a flow a wastewater and for introducing dissolved oxygen to a population of microorganisms to promote growth of biological flocs in a mixed liquor defined by a concentration of mixed liquor suspended solids. A weighting agent impregnation subsystem located downstream from the aeration tank includes an impregnation tank for mixing the mixed liquor, virgin weighting agent, and recycled weighting agent to impregnate the weighting agent into biological flocs suspended in the mixed liquor to form weighted biological flocs. A flocculant injection port located downstream from the aeration tank introduces a flocculant to the mixed liquor for enhancing settling and thickening of the weighted biological flocs and for providing agglomeration of non-impregnated biological flocs and/or partially impregnated biological flocs with weighted biological flocs. At least one clarifier separates and collects the weighted biological flocs from the mixed liquor to provide a secondary effluent and a settled sludge. A weighting agent recovery subsystem removes and shears the remaining settled sludge and recovers the weighting agent therefrom and reintroduces the weighting agent to the weighting agent impregnation subsystem. A wasting subsystem wastes the remaining sludge of the weight agent recovery subsystem to control the population of the microorganisms in the mixed liquor.

This invention also features a system for enhancing an activated sludge process that includes at least one aeration tank for receiving a flow a wastewater and for introducing dissolved oxygen to a population of microorganisms to promote growth of biological flocs in a mixed liquor defined by a concentration of mixed liquor suspended solids. A weighting agent impregnation subsystem includes an impregnation tank for mixing the mixed liquor, virgin weighting agent, and recycled weighting agent to impregnate the weighting agent into biological flocs suspended in the mixed liquor to form weighted biological flocs. A flocculant injection port located downstream from the aeration tank introduces a flocculant to the mixed liquor for enhancing settling and thickening of the weighted biological flocs and provides agglomeration of non-impregnated biological flocs and/or partially impregnated biological flocs with weighted biological flocs.

This invention further features a method for enhancing an activated sludge process, the method including the steps of: a) receiving a flow of wastewater and introducing dissolved oxygen to a population of microorganisms to promote growth of biological flocs in a mixed liquor defined by a concentration of mixed liquor suspended solids, b) impregnating a weighting agent into the biological flocs suspended in the mixed liquor to form weighted biological flocs, c) introducing a flocculant to the mixed liquor to enhance settling and thickening of the weighted biological flocs and to establish agglomeration of non-impregnated biological flocs and/or partially impregnated biological flocs with the weighted biological flocs, d) separating and collecting the weighted biological flocs from the mixed liquor in at least one secondary clarifier to provide a secondary effluent and a settled sludge, e) recycling the majority of the settled sludge to step a), f) removing and shearing the remaining settled sludge and recovering the weighting agent therefrom to reintroduce the weighting agent to step b), and g) wasting the remaining settled sludge in step f) to control the population of the microorganisms in the mixed liquor.

In one embodiment, the weighting agent may be impregnated into the biological flocs in step b) by mixing the mixed liquor and the biological flocs at a predetermined energy level. The mixing energy may be in the range of about 1.5 HP/1000 ft$^3$ to about 100 HP/1000 ft$^3$. The capacity of the activated sludge process may be increased by increasing the concentration of the mixed liquor suspended solids in step a) by reducing the amount of the settled sludge removed in steps f) and g). The nitrification of ammonia in the mixed liquid may be enhanced by increasing the concentration of mixed liquor suspended solids by reducing the amount of the settled sludge removed in steps f) and g). The nitrification may be enhanced by increasing the amount of oxygen introduced to the mixed liquor in step a). The removal of nitrogen from the mixed liquor may be enhanced by utilizing at least one anoxic zone. The removal of the phosphorus from the settled sludge may be enhanced by utilizing at least one anaerobic zone. The method may further include the step of adding a coagulant for removing phosphorus by precipitation and/or by coagulation. The weighting agent may include magnetite. The flocculant may include a cationic and/or an anionic polymer. The ratio of the weighting agent to mixed liquor may be greater than about 1:5 to 1. The method may further include the step of separating the weighting agent from the sheared settled sludge of step f) by utilizing a single pass wet drum magnetic separator. The secondary effluent may have a total suspended solids concentration less than about 30 mg/L.

This invention also features a method for enhancing an activated sludge process, the method including the steps of a) receiving a flow of wastewater and introducing dissolved oxygen to a population of microorganisms to promote growth of biological flocs in a mixed liquor defined by a concentration of mixed liquor suspended solids, b) impregnating a magnetically separable inorganic material into the biological flocs suspended in the mixed liquor to form weighted biological flocs, c) introducing a flocculant to the mixed liquor to enhance settling and thickening of the weighted biological flocs and to establish agglomeration of non-impregnated biological flocs and/or partially impregnated biological flocs with the weighted biological flocs, d) separating and collecting the weighted biological flocs from the mixed liquor in at least one secondary clarifier to provide a secondary effluent and a settled sludge, e) recycling the majority of the settled sludge to step a), f) removing and shearing the remaining settled sludge and recovering the magnetically separable inorganic material therefrom to reintroduce the magnetically separable inorganic material to step b), and g) wasting the remaining settled sludge in step f) to control the population of the microorganisms in the mixed liquor.

In one embodiment, the magnetically separable inorganic material may include magnetite.

This invention further features a method for enhancing an activated sludge process, the method including the steps of a) receiving a flow of wastewater and introducing dissolved oxygen to a population of microorganisms to promote growth of biological flocs in a mixed liquor defined by a concentration of mixed liquor suspended solids, b) impregnating a weighting agent into the biological flocs suspended in the mixed liquor to form weighted biological flocs, c) introducing a flocculant to the mixed liquor to enhance settling and thickening of the weighted biological flocs and to establish agglomeration of non-impregnated biological flocs and/or partially impregnated biological flocs with the weighted biological flocs, d) separating and collecting the weighted biological flocs from the mixed liquor in at least one secondary clarifier to provide a secondary effluent and a settled sludge, e) removing and shearing the remaining settled sludge and recovering the weighting agent therefrom to reintroduce the weighting agent to step b), and f) wasting the remaining settled sludge in step e) to control the population of the microorganisms in the mixed liquor.

This invention also features a method for enhancing an activated sludge process, the method including the steps of a) receiving a flow of wastewater and introducing dissolved oxygen to a population of microorganisms to promote growth of biological flocs in a mixed liquor defined by a concentration of mixed liquor suspended solids, b) impregnating a weighting agent into the biological flocs suspended in the mixed liquor to form weighted biological flocs, and c) introducing a flocculant to the mixed liquor to enhance settling and thickening of the weighted biological flocs and to establish agglomeration of non-impregnated biological flocs and/or partially impregnated biological flocs with the weighted biological flocs.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 1:
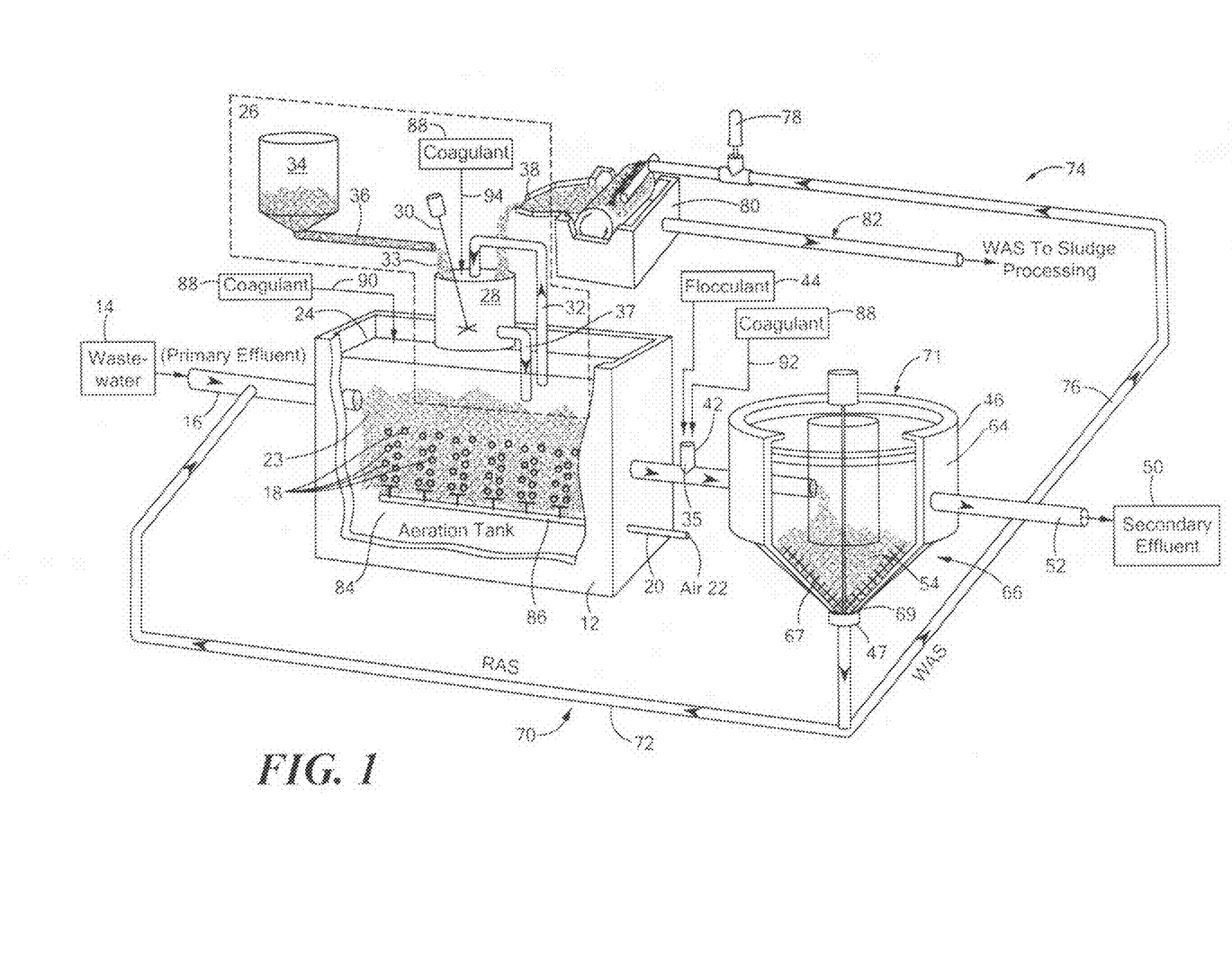
FIG. 1 is a three-dimensional view of one embodiment of the system for enhancing an activated sludge process of this invention.

There is shown in FIG. 1 one embodiment of system 10 for enhancing an activated sludge process of this invention. System 10 includes at least one aeration tank 12 which receives a flow of wastewater (primary effluent) 14 by line 16. Aeration tank 12 introduces dissolved oxygen 18 from line 20 exposed to ambient air 22 to a population of microorganisms to promote growth of biological flocs 23 in mixed liquor 24 (a combination of wastewater 14 and biological flocs 23 defined by to a concentration of mixed liquor suspended solids (MLSS), e.g., about 8000 mg/L, or similar concentration of MLSS known by those skilled in the art.

Figure 2:
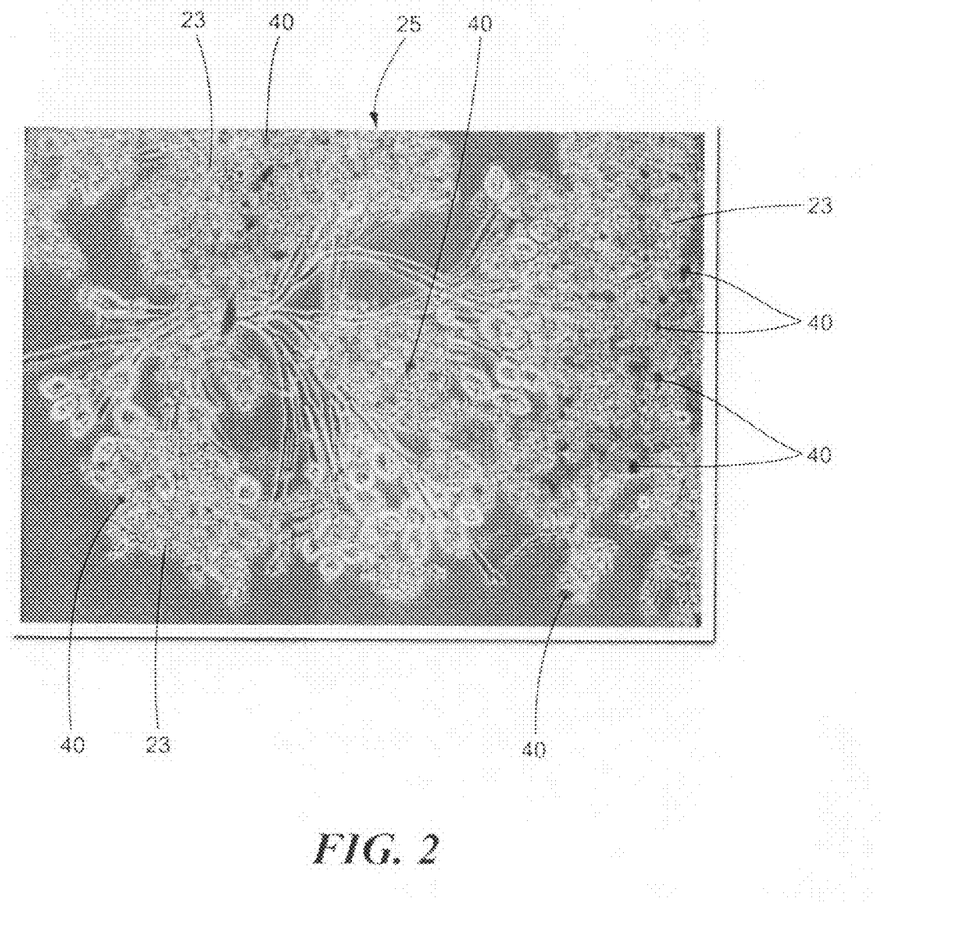
FIG. 2 is a three-dimensional view showing an example of a weighting agent impregnated in biological flocs in accordance with this invention.

System 10 also includes weighting agent impregnation subsystem 26 with impregnation tank 28 and mixer 30 which receives mixed liquor 24 from aeration tank 12 by line 32. Impregnation tank 28 also receives virgin weighting agent, indicated at 33, e.g., from feed hopper 34 by line 36, and recycled weighting agent, indicated at 38, from weight agent recovery subsystem 74 (discussed below). Weighting agent impregnation subsystem 26 mixes mixed liquor 24, the virgin weighting agent, and the recycled weighting agent in impregnation tank 28 to impregnate the weighting agent into biological flocs 23 suspended in mixed liquor 24 to form weighted biological flocs. In one embodiment, mixer 30 utilizes a mixing energy in the range of about 1.5 HP/1000 ft$^3$ to about 100 HP/1000 ft$^3$, e.g., about 25 HP/1000 ft$^3$, or any similar mixing energy which is sufficient to impregnate the weighting agent into biological flocs 23 suspended in mixed liquor 24 to form weighted biological flocs. The weighted biological flocs are then sent to aeration tank 12 by line 37. In one example, the weighting agent may be magnetite, or any similar type weighting agent or magnetically separable inorganic material known to those skilled in the art which increases the density of the biological flocs. As discussed in further detail below, increasing the density of biological flocs 23 by forming weighed biological flocs promotes rapid settling of the flocs in secondary clarifier 46. FIG. 2 shows one example of weighting agent 40 impregnated into biological flocs 23 to form weighted biological flocs 25.

System 10, FIG. 1 also includes flocculant injection port 42 located downstream from aeration tank 12 which introduces flocculant 44 into mixed liquor 24 in line 35. Flocculant 44 enhances settling and thickening of the weighted biological flocs suspended in mixed liquor 24 in secondary clarifier 46 and establishes agglomeration of non-impregnated biological flocs and/or partially impregnated biological flocs with the weighted biological flocs in secondary clarifier 46. In one example, flocculant 44 may be cationic or anionic polymer, such as Drewfloc® 2270 (Ashland Chemical, New Jersey), or any similar type polymer known to those skilled in the art.

The agglomeration of non-impregnated biological flocs and/or partially impregnated flocs with the weighted biological flocs makes larger weighted biological flocs to provide for rapid settling of the weighted biological flocs in settling zone 64 of clarifier 46. Flocculant 44 also enhances settling and thickening of the weighted biological flocs in thickening zone 66 of clarifier 46 by reducing the size of, and increasing the density of, the weighted biological flocs. This creates channels between the weighted biological flocs which allow water at bottom 69 of clarifier 46 to flow towards top 71 of clarifier 46 and weighted biological flocs to flow towards bottom 69 in thickening zone 66 of secondary clarifier 46 to enhance the thickening process.

Secondary clarifier 46 separates and collects the weighted biological flocs from the mixed liquor using rake or siphon subsystem 67 to provide secondary or clean effluent 50 in line 52 and settled sludge 54 at bottom 69 of clarifier 46. Because the weighted biological flocs have a greater specific gravity than non-impregnated biological flocs, e.g., about 2.5, they settle faster in secondary clarifier 46 than non-impregnated biological flocs utilized in a typical system for an activated sludge process. Thus, secondary clarifier 46 effectively and efficiently separates the weighted biological flocs from the mixed liquor to provide secondary effluent 50. As a result, the time needed to separate weighted biological flocs from mixed liquor 24 of the system 10 is reduced when compared to a typical activated sludge process. This increases the capacity of system 10 to process wastewater 14. Therefore, system 10 is more effective, efficient, reliable, cost effective, and robust than a typical system for an activated sludge process. Moreover, the size of clarifier 46 and/or aeration tank 12 can be reduced, allowing system 10 to treat the same quantity of wastewater in a smaller footprint. This reduces the installation costs and land requirements of system 10. Additionally, the problems associated with the separation process of the biological flocs from the mixed liquor in the secondary clarifier, as discussed in the Background Section, are alleviated.

System 10 preferably includes return activated sludge subsystem 70 which recycles the majority of settled sludge 54 in secondary clarifier 42 to aeration tank 12 by line 72 using pump 47.

Figure 3A:
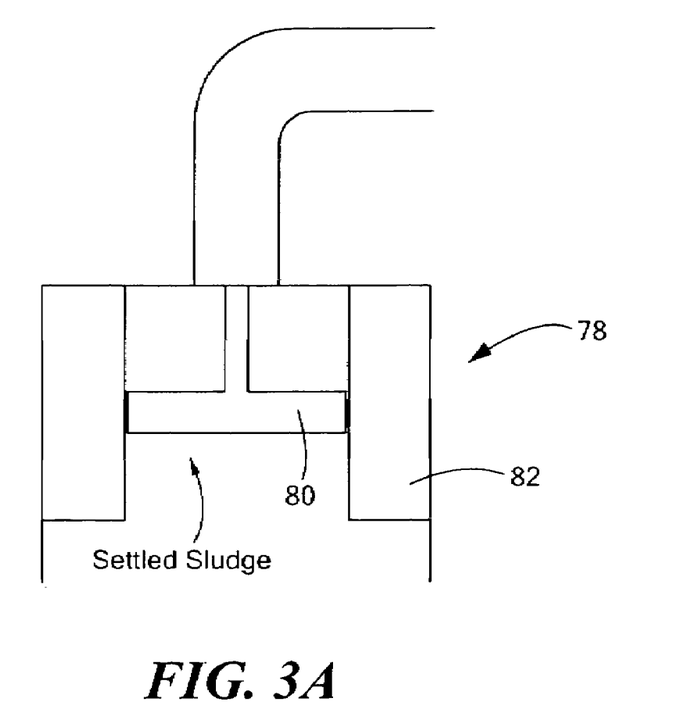
FIG. 3A is a schematic side view of one embodiment of an in-line shear mixer used with the weighting agent recovery system shown in FIG. 1.
Figure 3B:
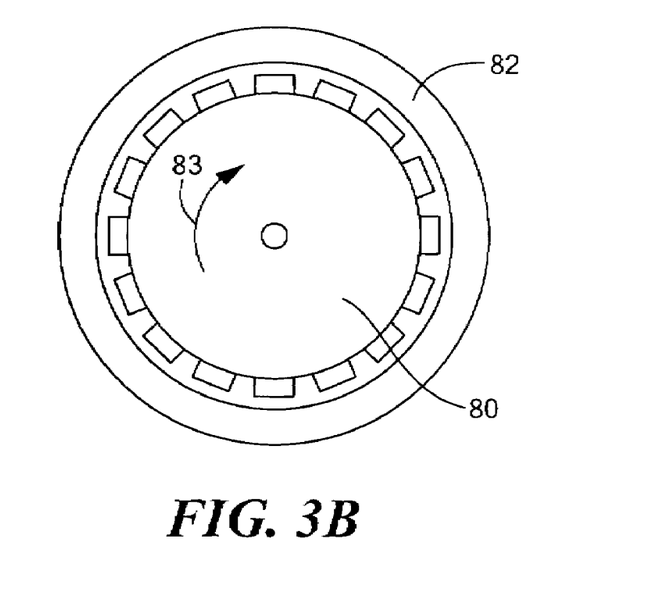
FIG. 3B is a schematic top view of the in line shear mixer shown in FIG. 3A.

System 10 ideally includes weighting agent recovery subsystem 74 which receives the remaining settled sludge not sent to aeration tank 12 by line 74 and recovers the weighting agent from the settled sludge and reintroduces the weighting agent to weighting agent impregnation subsystem 26, as indicated at 38. In one design, weighting agent recovery subsystem 74 includes in line shear mixer 78 which shears the remaining settled sludge in line 76 to separate the weighting agent in the settled sludge in line 76 from the mixed liquor. FIG. 3A shows a side-view of one example of in line shear mixer 78 which includes rotor 80 and stator 82. Shear mixer 78 is designed such that there is a close tolerance between a rotor 80 and stator 82. In operation, rotor 80 is driven at high speeds, e.g., greater than about 10,000 r.p.m., in direction 83, FIG. 3B. The result is a shearing effect which separates the weighting agent from the biological flocs in the remaining settled sludge in line 76 to facilitate recovery of the weighting agent by the weighting agent recovery subsystem 74.

Weighting agent recovery subsystem 74 may include single pass wet drum magnetic separator 80, FIG. 1, which recovers the separated weighting agent from the remaining settled sludge processed by in line shear mixer 78 and reintroduces the recovered weighting agent into weighting agent impregnation subsystem 26, as shown at 38. Further details of single pass wet drum magnetic separator 80 are also disclosed in co-pending application Ser. No. 11/893,350, filed Aug. 15, 2007, entitled "Fluidic Sealing System For a Wet Drum Magnetic Separator" by one or more of the inventors hereof, incorporated by reference herein.

System 10 also preferably includes wasting subsystem 82 which wastes the remaining settled sludge of weighting agent recovery subsystem 74, typically processed by wet drum magnetic separator 80, to control the population of the microorganisms in mixed liquor 24 in aeration tank 12.

The capacity of system 10 to process wastewater 14 may be increased by increasing the concentration of the MLSS in aeration tank 12 by reducing the amount of settled sludge wasted by wasting subsystem 82. The amount of settled sludge wasted by wasting subsystem 82 may also be reduced to increase the concentration of MLSS in aeration tank 12 to enhance nitrification of ammonia in mixed liquor 24. The nitrification process may also be further enhanced by increasing the amount of dissolved oxygen 18 introduced to aeration tank 12 by line 20.

Figure 4:
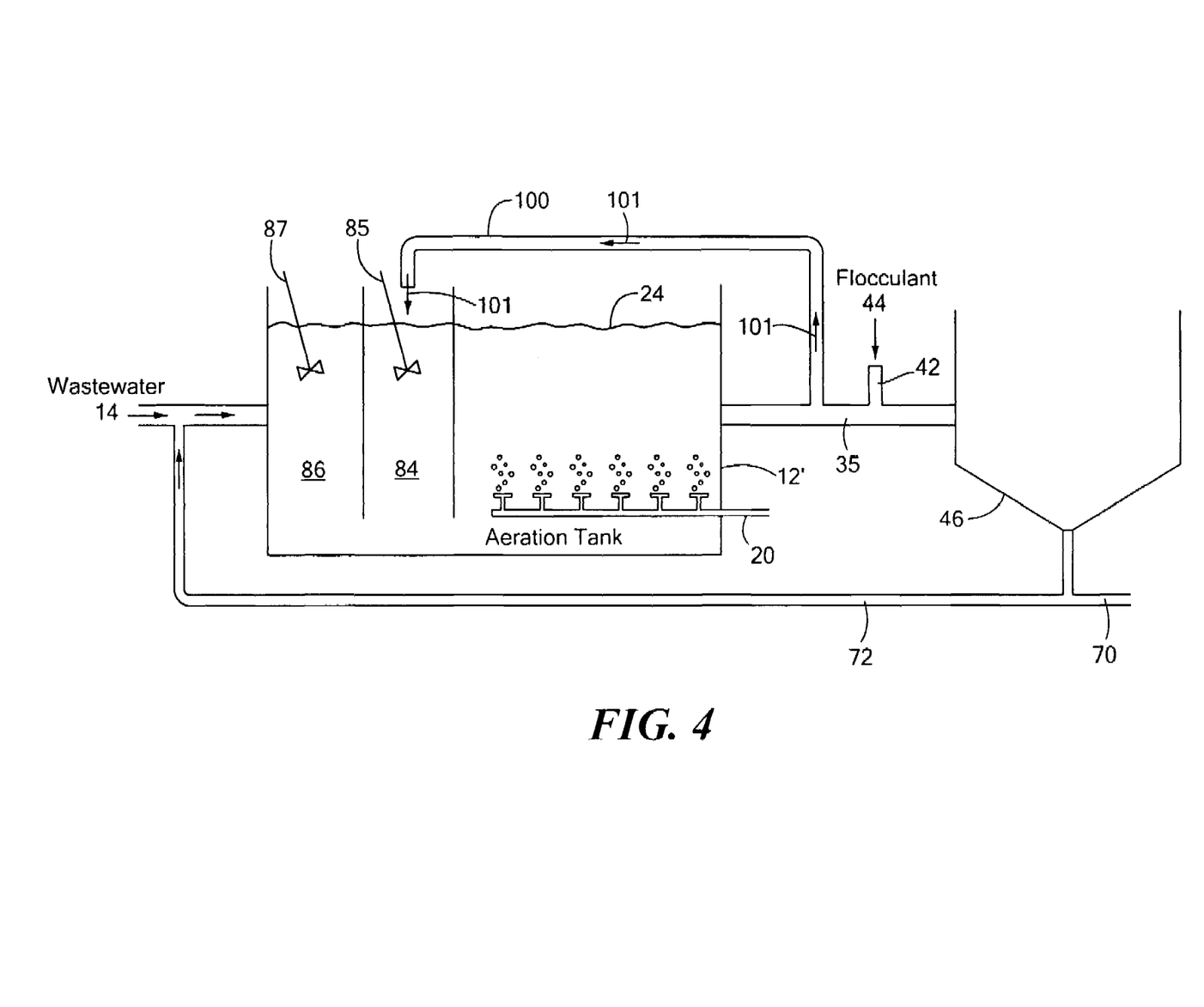
FIG. 4 is a schematic block diagram of one embodiment of the aeration tank shown in FIG. 1 including an anoxic zone configured to remove nitrogen and an anaerobic zone configured to remove phosphorus.

Aeration tank 12', FIG. 4, where like parts have been given like numbers, may include anoxic zone 84 with mixer 83 configured to remove nitrogen from mixed liquor 24. In this example, recycle line 100 connected to line 35 recycles mixed liquor 24 to anoxic zone 84, as shown by arrows 101. Aeration tank 12' may also include anaerobic zone 86 with mixer 87 configured to remove phosphorus from the mixed liquor 24 In this example, line 72 of return activated sludge subsystem 70 recycles the settled sludge to anaerobic zone 84. Many other possible biological nutrient removal configurations may be utilized, as known to those skilled in the art.

In one embodiment, coagulant 88, FIG. 1, may be added to aeration tank 12, as shown at 90, for removing phosphorus from mixed liquor 24 by precipitation and/or coagulation, as known by those skilled in the art. In other designs, coagulant 88 may be added to flocculant injection port 42, as shown at 92, to remove phosphorus by precipitation and/or coagulation. In yet another example, coagulant 88 may be added to impregnation tank 28, as shown at 94, for removing phosphorus by precipitation and/or coagulation.

In one embodiment, the ratio of the weighting agent, e.g., magnetite or similar type materials known to those skilled in the art, to mixed liquor 24 is greater than about 1.5 to 1.0. In one example, secondary effluent 50 has a suspended solid concentration of less than about 30 mg/L, which may meet local, state, and federal guidelines for secondary effluent 50.

Although as shown above with reference to FIG. 1, system 10 includes weighting agent impregnation subsystem 26 which receives mixed liquor from aeration tank 12 by line 32 and dispenses the weighted biological flocs into aeration tank by line 37, this is not a necessary limitation of this invention. In another embodiment, weighting agent impregnation subsystem 26a, FIG. 5, where like parts have been given like numbers, receives mixed liquor 24 from aeration tank 12 by line 32 and dispenses the weighted biological flocs processed by weighting impregnation subsystem 26a by line 37 to line 35 between aeration tank 12 and secondary clarifier 12.

Figure 5:
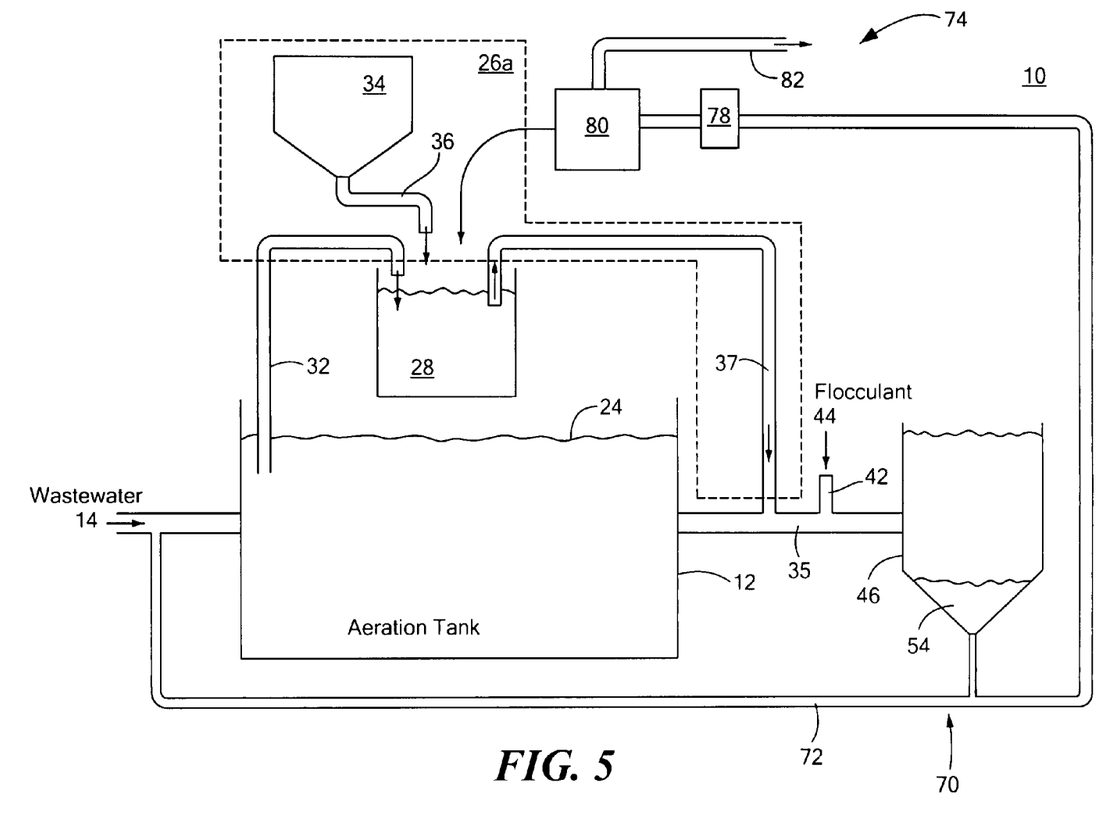
FIG. 5 is a schematic block diagram of another embodiment of the system for enhancing an activated sludge process of this invention.
Figure 6:
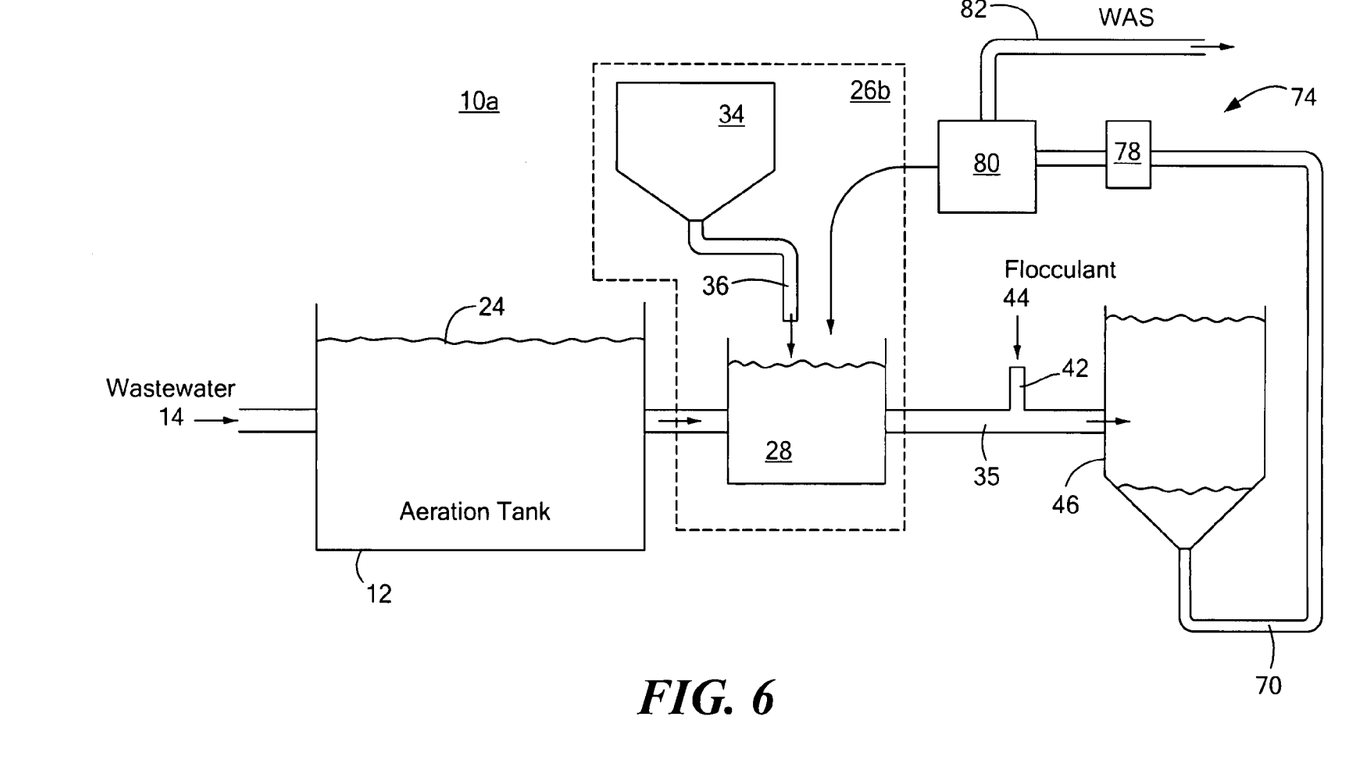
FIG. 6 is a schematic block diagram of yet another embodiment of the system for enhancing an activated sludge process of this invention.

In another design, system 10a, FIG. 6, where like parts have been given like numbers, includes weighting agent impregnation subsystem 26b which is located between aeration tank 12 and secondary clarifier 46. In this example, wastewater 14 may be from a brewery processing system or similar type processing system which has a high concentration of biodegradable organic matter in the incoming wastewater 14. In this design, system 10a does not need return activated sludge subsystem 70 as shown in FIGS. 1 and 5 because enough organisms are grown from the removal of influent organic matter to maintain a suitable population of microorganisms in the mixed liquor 24.

Figure 7:
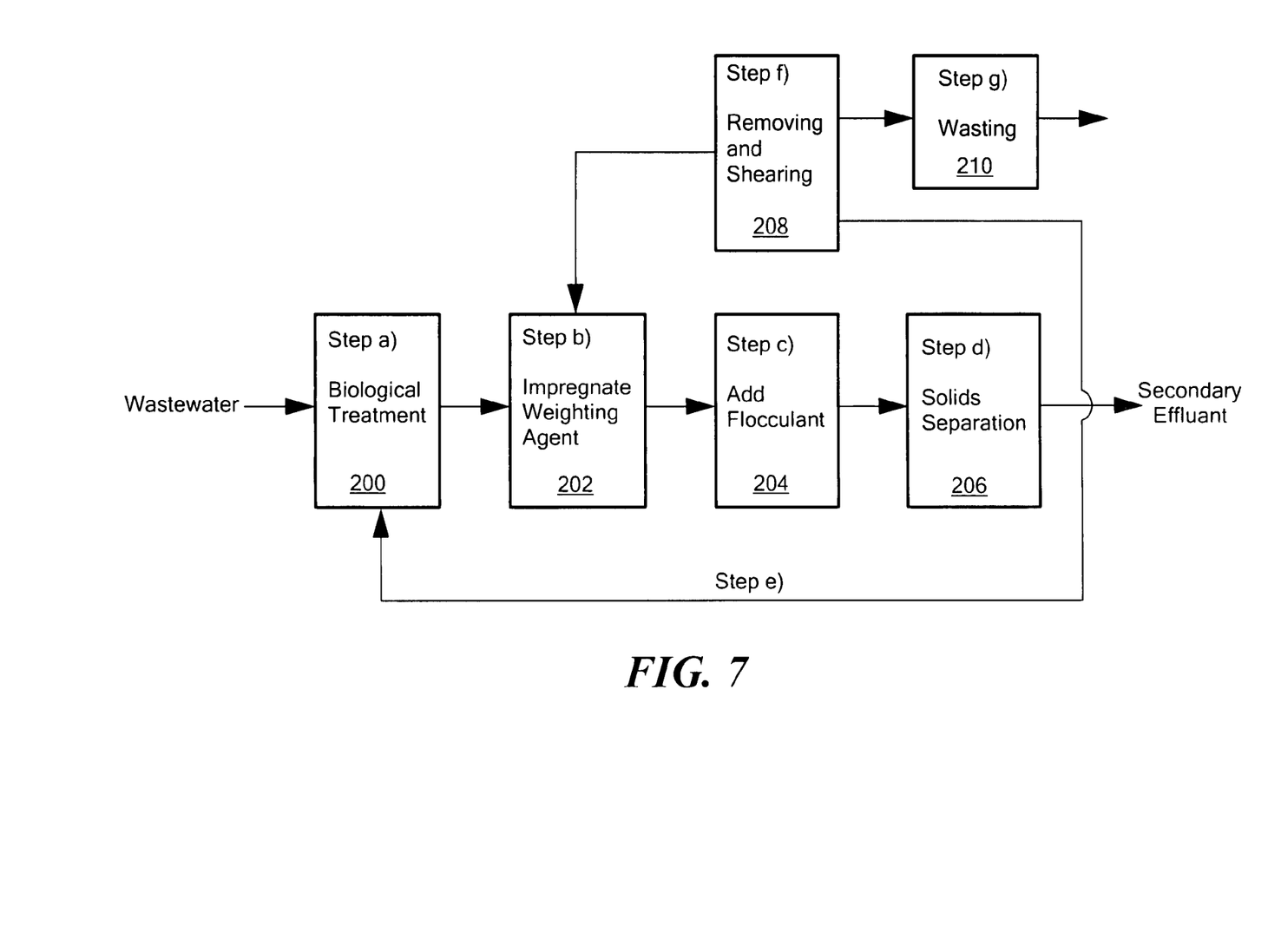
FIG. 7 is a schematic block diagram showing the primary steps of the method for enhancing an activated sludge process of this invention.

The method for enhancing an activated sludge process of this invention preferably comprises the steps of: receiving a flow of wastewater and introducing dissolved oxygen to a population of microorganisms to promote growth of the biological flocs in a mixed liquor defined by a concentration of a mixed liquor suspended solids, step a) 200; FIG. 7, impregnating weighting agent into the biological flocs suspended in the mixed liquor to form weighted biological flocs, step b) 202; introducing a flocculant to the mixed liquor to enhance settling and thickening of the weighted biological flocs and to establish agglomeration of non-impregnated biological flocs and/or partially impregnated biological flocs with the weighted biological flocs, step c) 204; separating and collecting the biological flocs from the mixed liquor in at least one clarifier to provide a secondary effluent and a settled sludge, step d) 206; removing and shearing the settled sludge and recovering the weighting agent therefrom to reintroduce the weighting agent to step b) 202, step f) 208; and wasting the remaining settled sludge in step f) 208 to control the population in the mixed liquor, step g) 210. The details of the operation of steps 200-210 are discussed in detail above with reference to FIGS. 1-6.

In one embodiment, the method may include the step of increasing the capacity of the activated sludge process by increasing the concentration of mixed liquor suspended solids in step a) 200 by reducing the amount of settled sludge removed in step f) 208 and step g) 210. Nitrification of ammonia in the mixed liquor may be enhanced by increasing the concentration of the mixed liquor suspended solids by reducing the amount of settled sludge removed in step f) 208 and step g) 210. The nitrification may be enhanced by increasing the oxygen introduced to the mixed liquor in step a) 200. The removal of nitrogen from the mixed liquor may be enhanced by utilizing at least one anoxic zone in step a) 200. The removal of phosphorus from the settled sludge may be enhanced by utilizing at least one anaerobic zone in step a) 200.

The method of enhancing an activated sludge process may also include the step of adding a coagulant for removing phosphorus by precipitation and/or by coagulation. The method of enhancing an activated sludge process may utilize a weighting agent that includes magnetite or similar type weighting agent or magnetically separable inorganic material known by those skilled in the art. The method may utilize a flocculant that includes a cationic and/or anionic polymer. In one example, the ratio of the weighting agent to the mixed liquor may be greater than about 1.5 to 1.0. The method of enhancing an activated sludge process may also include the step of separating the weighting agent from the sheared settled sludge of step f) 208 by utilizing a single pass wet drum magnetic separator, e.g., wet drum magnetic separator 80, FIG. 1. In one embodiment, the secondary effluent may have a total suspended solid concentration less than about 30 mg/L.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A system for enhancing an activated sludge process comprising:
    at least one aeration tank for receiving a flow a wastewater and for introducing dissolved oxygen to a population of microorganisms to promote growth of biological flocs in a mixed liquor defined by a concentration of mixed liquor suspended solids;
    a weighting agent impregnation subsystem including an impregnation tank for mixing the mixed liquor, virgin weighting agent, and recycled weighting agent to impregnate the weighting agent into biological flocs suspended in the mixed liquor to form weighted biological flocs;
    a flocculant injection port located downstream from the aeration tank for introducing a flocculant to the mixed liquor for enhancing settling and thickening of the weighted biological flocs and for providing agglomeration of non-impregnated biological flocs and/or partially impregnated biological flocs with weighted biological flocs;
    at least one clarifier for separating and collecting the weighted biological flocs from the mixed liquor to provide a secondary effluent and a settled sludge;
    a return activated sludge subsystem for recycling the majority of the settled sludge to the aeration tank;
    a weighting agent recovery subsystem for removing and shearing the remaining settled sludge and recovering the weighting agent therefrom and reintroducing the weighting agent to the weighting agent impregnation subsystem; and
    a wasting subsystem for wasting the remaining settled sludge of the weighting agent recovery subsystem to control the population of the microorganisms in the mixed liquor.

2. The system of claim 1 in which the mixing tank energy is in the range of about 1.5 HP/1000 ft$^3$ to about 100 HP/1000 ft$^3$.

3. The system of claim 1 in which the weighting agent impregnation subsystem includes a storage subsystem for storing the virgin weighting agent and dispensing the virgin weighting agent to the mixing tank.

4. The system of claim 1 in which the capacity of the system is increased by increasing the concentration of the mixed liquor suspended solids in the aeration tank by reducing the amount of the settled sludge wasted by the wasting subsystem.

5. The system of claim 1 in which the amount of the settled sludge wasted by the wasting subsystem is reduced to increase the concentration of mixed liquor suspended solids for enhancing nitrification of ammonia in the mixed liquor.

6. The system of claim 5 in which the nitrification is enhanced by increasing the amount of dissolved oxygen introduced into the aeration tank.

7. The system of claim 6 in which the aeration tank includes at least one anoxic zone configured to remove nitrogen from the mixed liquor.

8. The system of claim 7 in which the aeration tank includes at least one anaerobic zone configured to remove of phosphorus from the settled sludge.

9. The system of claim 1 in which a coagulant is added to the aeration tank for removing phosphorus by precipitation and/or coagulation.

10. The system of claim 1 in which a coagulant is added to the impregnation tank for removing phosphorus by precipitation and/or coagulation.

11. The system of claim 1 in which a coagulant is added to the flocculant injection port for removing phosphorus by precipitation and/or coagulation.

12. The system of claim 1 in which the weighting agent includes magnetite.

13. The system of claim 1 in which the flocculant includes a cationic and/or anionic polymer.

14. The system of claim 1 in which the ratio of the weighting agent to mixed liquor is greater than about 1:5 to 1.

15. The system of claim 1 in which the weighting agent recovery subsystem includes an in-line shear mixer for separating the biological flocs from the weighting agent.

16. The system of claim 15 in which the weighting agent recovery subsystem includes a single pass wet drum magnetic separator for recovering the weighting agent from the remaining settled sludge and for introducing the recovered weighting agent into the impregnation tank.

17. The system of claim 1 in which the secondary effluent has a total suspended solids concentration less than about 30 mg/L.

18. The system of claim 1 in which the weighting agent impregnation subsystem dispenses the mixed liquor from the aeration tank to the impregnation tank and dispenses the weighted biological flocs back to the aeration tank.

19. The system of claim 1 in which the weighting agent impregnation subsystem is located downstream from the aeration tank and before the secondary clarifier.

20. A system for enhancing an activated sludge process comprising:
    at least one aeration tank for receiving a flow of wastewater and for introducing dissolved oxygen to a population of microorganisms to promote growth of biological flocs in a mixed liquor defined by a concentration of mixed liquor suspended solids;
    an impregnation subsystem including an impregnation tank for mixing the mixed liquor, virgin magnetically separable inorganic material, and recycled magnetically separable inorganic material to impregnate the magnetically separable inorganic material into biological flocs suspended in the mixed liquor to form weighted biological flocs;
    a flocculant injection port located downstream from the aeration tank for introducing a flocculant to the mixed liquor for enhancing settling and thickening of the weighted biological flocs and for providing agglomeration of non-impregnated biological flocs and/or partially impregnated biological flocs with weighted biological flocs;

at least one clarifier for separating and collecting the weighted biological flocs from the mixed liquor to provide a secondary effluent and a settled sludge;

a return activated sludge subsystem for recycling the majority of the settled sludge to the aeration tank;

a recovery subsystem for removing and shearing the remaining settled sludge and recovering the magnetically separable inorganic material therefrom and reintroducing the magnetically separable inorganic material to the magnetically separable inorganic material impregnation subsystem; and a wasting subsystem for wasting the remaining sludge of the magnetically separable inorganic material recovery subsystem to control the population of the microorganisms in the mixed liquor.

21. The system of claim 20 in which the magnetically separable inorganic material includes magnetite.

22. A system for enhancing an activated sludge process comprising:

at least one aeration tank for receiving a flow a wastewater and for introducing dissolved oxygen to a population of microorganisms to promote growth of biological flocs in a mixed liquor defined by a concentration of mixed liquor suspended solids;

a weighting agent impregnation subsystem located downstream from the aeration tank including an impregnation tank for mixing the mixed liquor, virgin weighting agent, and recycled weighting agent to impregnate the weighting agent into biological flocs suspended in the mixed liquor to form weighted biological flocs;

a flocculent injection port located downstream from the aeration tank for introducing a flocculant to the mixed liquor for enhancing settling and thickening of the weighted biological flocs and for providing agglomeration of non-impregnated biological flocs and/or partially impregnated biological flocs with weighted biological flocs;

at least one clarifier for separating and collecting the weighted biological flocs from the mixed liquor to provide a secondary effluent and a settled sludge;

a weighting agent recovery subsystem for removing and shearing the remaining settled sludge and recovering the weighting agent therefrom and reintroducing the weighting agent to the weighting agent impregnation subsystem; and a wasting subsystem for wasting the remaining sludge of the weight agent recovery subsystem to control the population of the microorganisms in the mixed liquor.

23. A system for enhancing an activated sludge process comprising:

at least one aeration tank for receiving a flow a wastewater and for introducing dissolved oxygen to a population of microorganisms to promote growth of biological flocs in a mixed liquor defined by a concentration of mixed liquor suspended solids;

a weighting agent impregnation subsystem including an impregnation tank for mixing the mixed liquor, virgin weighting agent, and recycled weighting agent to impregnate the weighting agent into biological flocs suspended in the mixed liquor to form weighted biological flocs; and a flocculant injection port located downstream from the aeration tank for introducing a flocculant to the mixed liquor for enhancing settling and thickening of the weighted biological flocs and for providing agglomeration of non-impregnated biological flocs and/or partially impregnated biological flocs with weighted biological flocs.

24. A method for enhancing an activated sludge process, the method comprising the steps of:

a) receiving a flow of wastewater and introducing dissolved oxygen to a population of microorganisms to promote growth of biological flocs in a mixed liquor defined by a concentration of mixed liquor suspended solids;

b) impregnating weighting agent into the biological flocs suspended in the mixed liquor to form weighted biological flocs;

c) introducing a flocculant to the mixed liquor to enhance settling and thickening of the weighted biological flocs and to establish agglomeration of non-impregnated biological flocs and/or partially impregnated biological flocs with the weighted biological flocs;

d) separating and collecting the weighted biological flocs from the mixed liquor in at least one secondary clarifier to provide a secondary effluent and a settled sludge;

e) recycling the majority of the settled sludge to step a);

f) removing and shearing the remaining settled sludge and recovering the weighting agent therefrom to reintroduce the weighting agent to step b); and g) wasting the remaining settled sludge in step f) to control the population of the microorganisms in the mixed liquor.

25. The method of claim 24 in which the weighting agent is impregnated into the biological flocs in step b) by mixing the mixed liquor and the biological flocs at a predetermined energy level.

26. The method of claim 25 in which the mixing energy is in the range of about 1.5 HP/1000 ft$^3$ to about 100 HP/1000 ft$^3$.

27. The method of claim 24 in which the capacity of the activated sludge process is increased by increasing the concentration of the mixed liquor suspended solids in step a) by reducing the amount of the settled sludge removed in steps f) and g).

28. The method of claim 24 in which nitrification of ammonia in the mixed liquid is enhanced by increasing the concentration of mixed liquor suspended solids by reducing the amount of the settled sludge removed in steps f) and g).

29. The method of claim 28 in which the nitrification is enhanced by increasing the amount of oxygen introduced to the mixed liquor in step a).

30. The method of claim 29 in which the removal of nitrogen from the mixed liquor is enhanced by utilizing at least one anoxic zone.

31. The method of claim 30 in which removal of the phosphorus from the sludge is enhanced by utilizing at least one anaerobic zone.

32. The method of claim 24 further including the step of adding a coagulant for removing phosphorus by precipitation and/or by coagulation.

33. The method of claim 24 in which the weighting agent includes magnetite.

34. The method of claim 24 in which the flocculant includes a cationic and/or an anionic polymer.

35. The method of claim 24 in which the ratio of the weighting agent to mixed liquor is greater than about 1:5 to 1.

36. The method of claim 24 further including the step of separating the weighting agent from the sheared settled sludge of step f) by utilizing a single pass wet drum magnetic separator.

37. The method of claim 24 in which the secondary effluent has a total suspended solids concentration less than about 30 mg/L.

38. A method for enhancing an activated sludge process, the method comprising the steps of:
- a) receiving a flow of a wastewater and introducing dissolved oxygen to a population of microorganisms to promote growth of biological flocs in a mixed liquor defined by a concentration of mixed liquor suspended solids;
- b) impregnating a magnetically separable inorganic material into the biological flocs suspended in the mixed liquor to form weighted biological flocs;
- c) introducing a flocculant to the mixed liquor to enhance settling and thickening of the weighted biological flocs and to establish agglomeration of non-impregnated biological flocs and/or partially impregnated biological flocs with the weighted biological flocs;
- d) separating and collecting the weighted biological flocs from the mixed liquor in at least one secondary clarifier to provide a secondary effluent and a settled sludge;
- e) recycling the majority of the settled sludge to step a);
- f) removing and shearing the remaining settled sludge and recovering the magnetically separable inorganic material therefrom to reintroduce the magnetically separable inorganic material to step b); and
- g) wasting the remaining settled sludge in step f) to control the population of the microorganisms in the mixed liquor.

39. The method of claim 38 in which the magnetically separable inorganic material includes magnetite.

40. A method for enhancing an activated sludge process, the method comprising the steps of:
- a) receiving a flow of a wastewater and introducing dissolved oxygen to a population of microorganisms to promote growth of biological flocs in a mixed liquor defined by a concentration of mixed liquor suspended solids;
- b) impregnating a weighting agent into the biological flocs suspended in the mixed liquor to form weighted biological flocs;
- c) introducing a flocculant to the mixed liquor to enhance settling and thickening of the weighted biological flocs and to establish agglomeration of non-impregnated biological flocs and/or partially impregnated biological flocs with the weighted biological flocs;
- d) separating and collecting the weighted biological flocs from the mixed liquor in at least one secondary clarifier to provide a secondary effluent and a settled sludge;
- e) removing and shearing the remaining settled sludge and recovering the weighting agent therefrom to reintroduce the weighting agent to step b); and
- f) wasting the remaining settled sludge in step e) to control the population of the microorganisms in the mixed liquor.

41. A method for enhancing an activated sludge process, the method comprising the steps of:
- a) receiving a flow of a wastewater and introducing dissolved oxygen to a population of microorganisms to promote growth of biological flocs in a mixed liquor defined by a concentration of mixed liquor suspended solids;
- b) impregnating a weighting agent into the biological flocs suspended in the mixed liquor to form weighted biological flocs; and
- c) introducing a flocculant to the mixed liquor to enhance settling and thickening of the weighted biological flocs and to establish agglomeration of non-impregnated biological flocs and/or partially impregnated biological flocs with the weighted biological flocs.

* * * * *